Patented Aug. 18, 1931

1,819,880

UNITED STATES PATENT OFFICE

HENRY V. DUNHAM, OF BAINBRIDGE, NEW YORK, ASSIGNOR, BY MESNE ASSIGNMENTS, TO THE CASEIN MANUFACTURING COMPANY OF AMERICA, INC., OF NEW YORK, N. Y., A CORPORATION OF DELAWARE

PROCESS OF TREATING RENNET CASEIN AND PRODUCT THEREOF

No Drawing.    Application filed April 24, 1929. Serial No. 357,890.

This process has for its object a treatment of rennet casein in such a manner as to render it capable of becoming soluble in water with the aid of proper quantities of any kind of alkali.

Quite large quantities of rennet casein are made and these are of two widely different qualities. The one quality is a very carefully prepared product, very free from mineral salts, fats and acidity and is utilized in the manufacture of casein plastics. Considerable special machinery is requierd for making this casein and relatively skilled men for preparing same and the price of such a rennet casein is generally higher than the other types of casein made.

The other grade of rennet casein is an extremely low grade and is only made as a by-product from the manufacture of what is known as "whey albumen cheese". To make this whey albumen cheese it is necessary to use rennet rather than acid, in order that the albumen cheese may have the proper flavor and qualities. Therefore, rennet is used as the coagulant of the milk but the milk is not handled in such a way in this process as to secure a casein good enough for casein plastics. On account of its poorer qualities, only small amounts of this second mentioned kind of rennet casein can be sold. A little of the total production is used in the manufacture of diabetic flours and for some other products but the demand is nowhere nearly equal to the production.

It is a well known fact that rennet casein (either kind) is not soluble in alkalies as are the varieties of casein made by precipitation with acids. I have found that I can so treat this latter kind of rennet casein as to make it soluble in any of the alkalies commonly used as casein solvents, in the presence of water, and by my method I am able to utilize this casein which heretofore, to my best belief, has not been extensively used in the industrial arts. The casein resulting from my novel process can be used for wood gluing, for paper coating and for other purposes where the acid precipitated caseins are ordinarily employed.

In carrying out my invention I may treat previously dried rennet casein or I may treat the rennet precipitated casein before it is dried, after it has been shredded or picked apart ready for drying. My preferred method is to treat the dry, unground casein, that is the casein just as it comes from the casein drying plant.

The following is an example:—

Example 1.—In an ordinary vat such as for example, a wooden vat, I put 1,000 pounds of cold water to which I have added 65 pounds of hydrofluoric acid or hydrofluosilicic acid having a strength of from 33% to 35%. To this diluted acid solution I add 1,000 pounds of the dry casein. The casein is slightly mixed or turned in the vat to somewhat assist in wetting it with the acid solution and the material is allowed to rest for about 12 hours. If one wishes, the top portion of the casein resting in the vat may be turned over once or twice during the 12 hours although this is not absolutely necessary.

The casein during this resting period absorbs the dilute acid solution so that after 12 hours or thereabouts there is practically no acid solution as such remaining in the vat, the casein having absorbed the entire amount and as indicated above this casein will then contain approximately 50% of this weak acid solution.

After the 12 hours or thereabouts in which the casein has absorbed the weak acid solution, water (say 500 to 2,000 pounds or more) is run into the vat in order to wash this treated casein. Enough water is used in this step to cover the casein, and this mixture is thoroughly stirred, the casein allowed to settle and the wash water drawn off. Preferably a second washing is carried out in the same manner as described above and then the casein is pressed and ready for the redrying operation. This casein (which may then contain 50% or so of water), is then dried in any of the usual methods of drying casein. When dry it may be ground, stored, dissolved, etc., like dried acid-precipitated casein.

The dried product is readily soluble in alkali solutions, and its solubility is about as good as that of ordinary grades of mineral-acid-precipitated casein. The ash content has been reduced a little, or at any event has not been increased. Ash determinations are considered to be of importance in the trade, ash determinations being frequently made by the purchasers of casein to show whether or not there has been "adulteration".

In a particular case, ash determinations were made on (a) the untreated rennet casein, (b) the "treated" but unwashed intermediate product (i. e. after soaking up the diluted acid solution) and (c) on the treated and washed casein (i. e. the final product after two washings as above described). These (all computed to the water-free basis) showed ash as follows:—

|   | Per cent |
|---|---|
| (a) In untreated rennet casein | 7.9 |
| (b) In treated but unwashed casein | 8.7 |
| (c) In treated and washed casein | 7.1 |

The ash in the final casein will of course depend on the amount and character of the ash in the untreated casein, amount of washing, etc.

The acidity of the treated casein will depend on numerous factors, notably amount of acid used and the thoroughness of the washing. In a particular case, samples were titrated with $n/10$ NaOH solution, with the following results (figured on 2 grams of actual casein, water-free basis):—

A two gram sample of the untreated rennet casein required 4.2 cc. $n/10$ caustic soda to neutralize.

A two gram sample of the treated but unwashed rennet casein required 7.5 cc. $n/10$ caustic soda to neutralize.

A two gram sample of the washed, treated rennet casein required 6 cc. $n/10$ caustic soda to neutralize.

The data given in the last five paragraphs is of course taken from particular runs of the process, and the specific figures would differ in different runs. These figures may be taken however as being fairly representative. This data is of course given only by way of illustration and not in any limiting sense.

*Example 2.*—If a freshly precipitated rennet casein is to be treated by my process, the tough chunks of casein are first put through a shredding machine or picker or both, in exactly the same way as if it were to be dried. The casein is then put into a vat and the treatment continued as per the following example:—

1,000 pounds of the freshly precipitated, picked or shredded casein ready for drying, is placed in an ordinary wooden milk vat, the casein having a moisture content of approximately 50%. 32½ pounds of hydrofluosilicic or hydrofluoric acid of a strength of approximately 33% to 35% are mixed with 250 pounds of cold water and this mixture poured into the vat containing the 1,000 pounds of picked casein. The mixture is made as uniform as possible by stirring or shoveling over the mass of casein with this weak acid solution, and the mixture is allowed to stand for about 12 hours. At the end of this time the casein is thoroughly washed with cold water, using enough water to completely cover the casein after it has settled to the bottom of the vat. After the casein has settled, the wash water is drawn off and preferably the casein is given a second similar washing. The casein is then removed from the vat, pressed and dried in the usual way.

This latter example is not my preferred one. For some reason even though the casein contains the relatively large amount of water, since the casein has never been dried, yet it seems necessary to add more water in this case to get the acid to act upon the casein sufficiently. Numerous attempts made by adding the undiluted acid to the wet casein, while somewhat improving the quality of the casein, yet do not give as perfect a product and is not as satisfactory.

Furthermore this second method, viz. treating the wet casein, is not as desirable since creameries usually prefer not to do any more special handling or processing or treating of casein than is necessary. In general they have neither the room, time, nor skill for any special treatment or handling of casein and I have therefore, found it much more satisfactory to follow the first example outlined above.

I have stated above that the product of Example 2 is not so good as the product of Example 1. By this I mean that the product of the first example is apparently completely soluble in alkali solution, but the product of Example 2 is not perfectly soluble with the same amount of alkali as the product of the first example. The presence of some insoluble material, in the final casein solution is always objectionable for many uses, for example in the coating of paper. The product would however be good enough for many of the uses of casein.

In making rennet casein, at a creamery, it is common to put the casein in a wet condition into barrels, and while it is in the soft condition it joins together into a solid chunk, completely filling the barrel as a solid piece. This product can be kept for a short time, without material injury. Thus in ordinary spring and fall weather these barrels might be shipped a considerable distance, requiring say ten days or even two weeks, without substantial injury. In winter time even a longer period could elapse. Even in summer time the product would keep for perhaps four or five days or a week without substantial injury. This is of importance because many of the creameries that make rennet casein do not have any drying equipment, and would not have enough of the rennet casein to make it economical for them to run a drier.

I do not wish to limit this invention to the exact amount of acid mentioned in these examples. It is possible to use somewhat less acid and get some improvement over the untreated rennet casein and one might use more than the amount of acid mentioned in these examples but in that case there is a somewhat greater loss in the finished dry casein and the quality is apparently not much better because of the increased acidity over the amount mentioned in the examples.

By way of illustration, in connection with varying the amount of acid, the amount of actual acid (hydrofluoric or hydrofluosilicic) in the above examples, is about 2% (based on the actual casein). When using 1%, the improvement in the solubility of the casein is not good enough for most of the uses of dissolved casein. With 1½ per cent of acid the product is of much better solubility than when 1% of acid is used, but this is rather below the solubility of the 2% treated product. When amounts of the acids above 2% are used, the solubility of the product is not considerably better than when using 2%. Also the treating loss is greater.

When following the process of Example 1, which is the preferred method, there is some loss of casein, about 7 to 8% or even up to 10%. (This observation is based on the treatment of many carloads of rennet casein). When 3% or more of acid is employed, the loss is substantially greater. Hence I recommend 2% as being the best amount of acid, or at any event nearly this amount.

After much experimentation and commercial work with the process of the present invention, it is my opinion that the hydrofluoric acid or hydrofluosilicic acid acts in some manner upon the casein, chemically, to modify the same.

In addition to this, the acid appears to dissolve something in the casein, probably a little of the casein itself, during the soaking process, and this may be removed during the washing operation.

I am aware that it has hereofore been proposed to add sodium fluoride to rennet casein, at the time of dissolving the same in alkali. So far as I am aware however such a process has not come into practical use. My experiments indicate that treatment with sodium fluoride is not the equivalent of treatment with hydrofluoric acid or hydrofluosilicic acid. The addition of sodium fluoride to the casein in a wet condition, or the addition of sodium fluoride and water to casein as a substitute for the hydrofluoric acid of Example 1 of the present invention does not produce satisfactory results. There is formed on the contrary, a semi-gelatinous sticky mass which would be difficult or impossible to handle in any practical way in the drying operation. The mass would be entirely too sticky and gummy to run through the ordinary picker, and the mass would stick to the drying screen. Furthermore the solubility of the product would not be improved to anything like the same extent as in the process of the present case.

The viscosity of the treated rennet casein solution, produced by dissolving the treated rennet casein in alkali, is not very much higher than the viscosity of casein solution produced from a fairly good grade of pressed casein, and is substantially lower than the viscosity produced from ordinary (not chemically treated) cooked casein, dissolved in an alkali solution under similar conditions.

I have herein referred to hydrofluoric acid and hydrofluosilicic acid, as the mineral acid used in carrying out the present process. I have also experimented with several other mineral acids, and while they are capable of producing some improvement in the solubility of rennet casein, they do not give in any case nearly as good a solubility as the two acids above referred to, which are hereinafter referred to in the generic sense, by the expression "a fluorine-containing mineral acid".

I have above stated that the hydrofluoric acid treatment, as described in the present case produces a slight loss of casein. It is found that if the wash water (which is acid) is just neutralized, without adding any excess of alkali thereto to make it alkaline, a small amount of casein or material at least very similar to casein, is precipitated. However I do not include in the present invention, the working up of this wash water which is of course very dilute.

As stated above the acidity of the final product of Example 1 is substantially greater than the acidity of the untreated rennet casein. The acidity is to be taken into consideration when dissolving the treated rennet casein in alkali. It may require rather more alkali to dissolve treated rennet casein than would be required to dissolve a good grade of pressed casein (made by the use of mineral acid), and while the solubility of the treated rennet casein is practically as good as the average grade pressed casein, the solubility may not be quite as good as that of exceptionally good well made pressed casein. However the solubility is good enough for most of the purposes for which casein is used, and furthermore the viscosity of the casein solution so produced is about as low as that of average grade of casein made by the use of mineral acid, and far better than that of cooked casein (chemically untreated).

In the commercial treatment of many thousands of pounds of rennet casein from different sources, I have found that Example 1 above outlined gives the most satisfactory results.

The present invention is in part a continuation of matter disclosed in my copending application 607,221 filed December 15, 1922, in which I have disclosed the treatment of rennet casein with dilute hydrofluoric acid, followed by drying.

I have referred in Example 1, to using 1,000 pounds of dry casein and 1,000 pounds of water, with which is mixed 65 pounds of the fluorine-containing mineral acid. This amount of liquid will about cover the casein. However I call attention to the fact that a much smaller amount of water, say 300 pounds could be used, (which would not cover the casein) and the operation carried out in apparatus such as a rotary barrel, in which the materials are tumbled or mixed (continuously or at intervals) so that the casein would absorb this amount of acid substantially uniformly. The procedure as in Example 1, is preferred. The water used in this treating operation, and in the washing, may be at atmospheric temperature, i. e. it does not have to be heated or kept hot.

I claim:—

1. An acid rennet casein modified by treatment with a fluorine containing mineral acid having practically as good solubility in alkali solutions as have the average grades of mineral-acid-precipitated casein, such product having no greater ash content than ordinary rennet casein.

2. A rennet casein modified by treatment with a fluorine containing mineral acid having practically as good solubility in alkali solutions as have the average grades of mineral-acid-precipitated casein, such product having no greater ash content than ordinary rennet casein, such product containing fluorine compounds and being somewhat more acid than ordinary good rennet casein.

3. In the process of making alkaline solutions of casein, the step which comprises allowing rennet casein to stand for several hours with water in amount not considerably less than the actual casein and with an amount of a fluorine-containing mineral acid equal to about 1½ to 2%, based on the weight of the actual casein, prior to treatment with alkaline solvent for casein.

4. In the process of making alkaline solutions of casein, the steps which comprise allowing rennet casein to stand for several hours with water in amount not considerably less than the actual casein and with an amount of a fluorine-containing mineral acid equal to about 1½ to 2%, based on the weight of the actual casein and thereafter washing the casein, said steps being performed prior to treatment with alkaline solvent for casein.

5. In the process of making alkaline solutions of casein, the steps which comprise mixing 1 part of water with enough fluorine-containing mineral acid to give an acid concentration of about 2%, mixing this acid solution with about 1 part of dry rennet casein and letting stand for several hours for the acid solution to be absorbed by the casein, said steps being performed prior to treatment with alkaline solvent for casein.

6. In the process of making alkaline solutions of casein, the steps which comprise mixing 1 part of water with enough fluorine-containing mineral acid to give an acid concentration of about 2%, mixing this acid solution with about 1 part of dry rennet casein, letting stand for several hours for the acid solution to be absorbed by the casein, and thereafter washing the casein with water, said steps being performed prior to treatment with alkaline solvent for casein.

7. In the process of making alkaline solutions of casein, the step which comprises allowing rennet casein to stand for several hours with a substantial volume of water containing an amount of a fluorine-containing mineral acid equal to about 1½ to 2%, based on the weight of the actual casein, prior to treatment with alkaline solvent for casein.

8. In the process of making alkaline solutions of casein, the steps which comprise mixing dried rennet casein with a very dilute solution of a free fluorine-containing mineral acid, the total amount of such actual acid being equal to not more than a few per cent of the actual casein, and allowing contact of such casein and acid solution for several hours, said steps being performed prior to treatment with alkaline solvent for casein.

9. In the process of making alkaline solutions of casein, the steps which comprise mixing dried rennet casein with a very dilute solution of a free fluorine-containing mineral acid, the total amount of such actual acid being equal to not more than a few per cent of the actual casein, allowing contact of such casein and acid solution for several hours, thereafter washing the treated product with water, and redrying the casein, whereby a modified rennet casein of good solubility is produced, said steps being performed prior to treatment with alkaline solvent for casein.

10. A rennet casein modified by treatment with a fluorine containing mineral acid having better solubility in alkali solutions than have the average grades of cooked casein, such treated rennet casein giving a solution in alkali having a substantially lower viscosity than solutions of similar casein concentration of average grade cooked casein, and such product having no greater ash content than ordinary rennet casein.

11. In the process of making alkaline solutions of casein, the steps which comprise allowing rennet casein to stand for several hours with water containing a few per cent of a fluorine-containing mineral acid, based on the weight of the actual casein, and thereafter washing the casein, said steps being performed prior to treatment with alkaline solvent for casein.

12. In the process of making alkaline solutions of casein, the steps which comprise mixing water with enough fluorine-containing mineral acid to give an acid concentration of about 2%, mixing this acid solution with dry rennet casein and maintaining contact of the casein and acid solution for several hours for the acid solution to be absorbed by the casein to modify the solubility thereof, said steps being performed prior to treatment with alkaline solvent for casein.

13. In the process of making alkaline solutions of casein, the steps which comprise allowing rennet casein to stand for several hours with water containing a few per cent of a fluorine-containing mineral acid, based on the weight of the actual casein, thereafter washing the casein and thereafter drying the modified casein product, said steps being performed prior to treatment with alkaline solvent for casein.

In testimony whereof I affix my signature.

HENRY V. DUNHAM.